United States Patent [19]

Stevenson

[11] Patent Number: 5,025,823
[45] Date of Patent: Jun. 25, 1991

[54] ACCUMULATOR AND VALVE STRUCTURE

[75] Inventor: Paul D. Stevenson, Ann Arbor, Mich.

[73] Assignee: General Motors Corporation, Detroit, Mich.

[21] Appl. No.: 586,164

[22] Filed: Sep. 21, 1990

[51] Int. Cl.⁵ .............................................. G05D 16/10
[52] U.S. Cl. ................................ 137/110; 137/505.18
[58] Field of Search ................. 137/110, 599, 505.8

[56] References Cited

U.S. PATENT DOCUMENTS

| | | | |
|---|---|---|---|
| 3,517,681 | 6/1970 | Davison | 137/505.18 |
| 4,089,007 | 5/1978 | Perry | 137/110 X |
| 4,402,254 | 9/1983 | Petrimaux | 137/110 X |
| 4,655,240 | 4/1987 | Flinchum | 137/110 |
| 4,867,014 | 9/1989 | Sugano | 74/868 |
| 4,889,016 | 12/1989 | Kuwayama et al. | 74/868 |

Primary Examiner—Alan Cohan
Attorney, Agent, or Firm—Donald F. Scherer

[57] ABSTRACT

A fluid flow control apparatus has an accumulator and valve structure disposed in combination with a restricted passage to provide engagement timing for a friction device. A bypass circuit, including the valve structure on the accumulator, is provided to permit rapid filling of the friction device prior to the commencement of the accumulator stroke.

4 Claims, 1 Drawing Sheet

ACCUMULATOR AND VALVE STRUCTURE

BACKGROUND OF THE INVENTION

This invention relates to engagement timing devices for fluid operated friction devices, and more particularly, to such timing devices utilizing an accumulator and flow restrictions.

Prior art devices have generally provided a single orifice control and accumulator for controlling the engagement timing of a friction device. These control mechanisms have the friction devices and the accumulator downstream of the orifice. This requires that the accumulator be of sufficient volume to accommodate the pressurizing time of the friction devices at a flow rate through the orifice that produces an acceptable fill and stroke time.

These devices further require that the size of the orifice be sufficiently large to provide an acceptable short fill and stroke time and is therefore a compromise to the preferred orifice size. There have been other proposed control mechanisms that provide a secondary pressure control valve to provide rapid filling of the friction device followed by controlled engagement timing. In these devices, the valve controls the pressure to the friction device in such a manner as to permit fluid flow to the accumulator to control a pressure drop through a restriction which in turn establishes the fluid flow level through the valve.

These control devices require a separate valve and accumulator structure with the valve structure requiring a bore, spring and valve spool. Furthermore, these structures generally have two control or feedback chambers, one of which is sensitive to clutch pressure and the other of which is sensitive to fluid flow to the accumulator.

SUMMARY OF THE INVENTION

The present invention provides for rapid filling of a friction device and controlled engagement time using a single orifice and an accumulator. The accumulator is substantially smaller in size as those currently used in single orifice systems. The accumulator of the present invention has a valve structure formed integrally therewith which is effective to permit rapid filling of the friction device prior to accumulator stroking and slower flow after the accumulator begins to stroke. This reduces the required size of the accumulator without the addition of the structure required for a separate valve system and also permits the use of an orifice system effective for both fill and accumulator controlled pressure for engagement.

It is therefore an object of this invention to provide an improved fluid flow timing apparatus, wherein an accumulator and valve structure are combined to permit an initial high fluid flow rate prior to the commencement of the accumulator stroke and a low fluid flow rate after a predetermined amount of stroke by the accumulator.

It is another object of this invention to provide an improved timing apparatus, as set forth in the preceding object, wherein the accumulator has a valve surface formed integrally with the accumulator piston and a controlled passage that is opened and closed by the valve surface to permit the high flow rate when the controlled passage is opened, and further wherein a flow restriction is disposed in serial flow relation with the accumulator for cooperation therewith to control the low flow rate when the controlled passage is closed.

These and other objects and advantages of the present invention will be more apparent from the following description and drawings.

DESCRIPTION OF THE EMBODIMENTS

Figure 1:
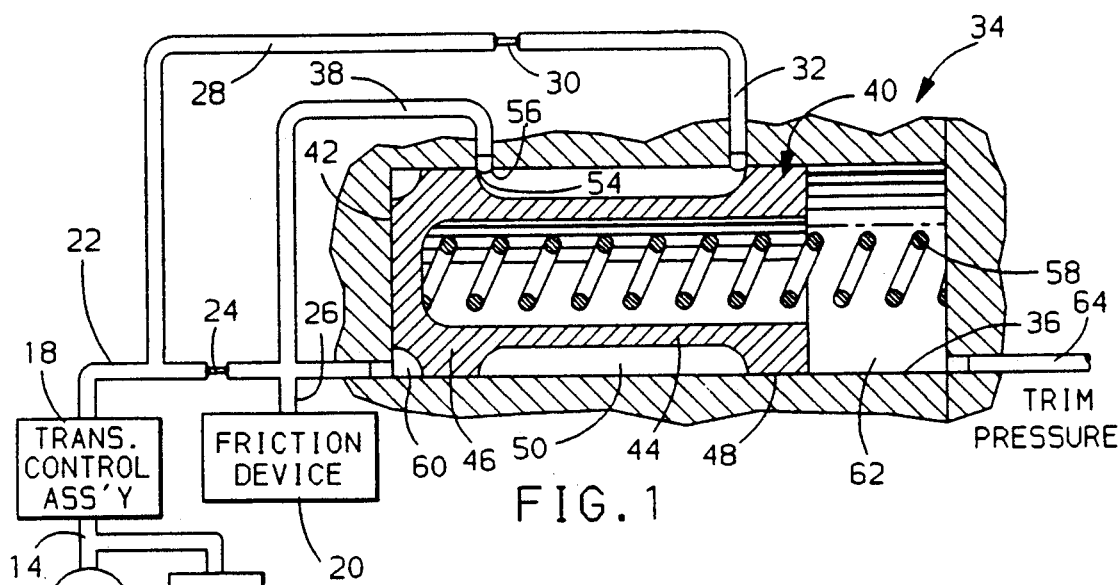
FIG. 1 is a diagrammatic representation of an exemplary embodiment of the invention.

Referring to the drawings, wherein like characters represent the same or corresponding parts throughout the several views, there is seen in FIG. 1 a conventional hydraulic pump 10 which draws fluid from a reservoir 12 for delivery to a controlled pressure passage 14. The pressure in passage 14 is established by a conventional regulator valve 16. The fluid in passage 14 is delivered to a transmission control assembly 18 for distribution to various components of the transmission.

One such element is a friction device 20 which is comprised of a conventional fluid operated brake or clutch assembly. The various elements which are included in the transmission control assembly 18, control the distribution of fluid pressure to an inlet passage 22 in a well known manner. Those familiar with the transmission control art will recognize that the passage 22 is pressurized whenever it is desirable to engage the friction device 20.

The passage 22 is connected through a fluid flow restriction 24 to an outlet passage 26, which in turn is connected with the friction device 20. The passage 22 also has a branch passage 28, which is connected through a restriction 30 to a controlled passage 32. An accumulator and valve control 34 has a cylindrical bore 36, which is connected for fluid communication with the controlled passage 32 and also with a controlled passage 38, which in turn is in fluid communication with the passage 26.

Slidably disposed within the bore 36 is an accumulator piston 40, which has an annular pressure responsive area 42 in a generally cylindrical body 44. The cylindrical body 44 has formed thereon a pair of annular valve lands 46 and 48, which are separated by a controlled annular passage 50. The annular valve land 46 has an annular control edge or surface 54, which in the position shown, is adjacent the controlled passage 38. The controlled passage 38 at is connection point with the bore 36, forms a control surface 56 which cooperates with the control edge 54 and valve land 46, to open and close communication between the annular control passage 50 and the controlled passage 38.

A spring member 58 urges the accumulator piston 40 to the position shown. In this spring set position, it is readily apparent that the fluid pressure in the controlled passage 32 can be freely transmitted through the controlled annular passage 50, and the controlled passage 38 to the friction device 20.

The flow restriction 30 is provided simply to establish the maximum flow permitted during initial filling of the friction device 20. This will be a large diameter restriction in the range of 5 to 6 mm in diameter. This is compared to the small flow restriction 24 which will generally be in the range of 0.6 to 0.8 mm in diameter. With the restriction 30 being of such a relatively large size, virtually unrestricted flow to the friction device is permitted when the accumulator and valve structure 34 is in the position shown. Prior art restrictions are approximately 2.0 mm in diameter.

The accumulator piston 40 cooperates with the bore 36 to provide an accumulator chamber 60, which is in fluid communication with the passage 26 downstream of the flow restriction 24. When the friction device 20 is engaged, the fluid admitted through the controlled passages 32 and 38 will rapidly bring the clutch friction device to a minimum pressure level, which will also react on the pressure responsive area 42 adjacent the accumulator chamber 60.

The pressure in the passage 26 will continue to increase, causing the accumulator piston 40 to move rightward against the spring 58. This rightward movement will cause the control edge 54 to close the control edge 54 to close the control surface 56, and therefore passage 38 from the virtually unrestricted fluid flow. Once this occurs, the flow restriction 24 will provide the timing function for the remainder of the engagement of the friction device 20. The piston 40 of the accumulator and valve structure 34 will continue to stroke until the accumulator chamber 60 reaches a maximum value, at which time, the system pressure will rise rapidly and the friction device 20 will be fully engaged.

The bore 36 and valve land 48 cooperate to form a trim chamber 62. The trim chamber 62 is in fluid communication with a trim pressure passage 64 which introduces fluid pressure to the trim chamber 62. Pressure in the chamber 62 and the spring 58 controls the point of stroke commencement for the accumulator piston 40. Therefore, the minimum pressure in the friction device 20 prior to the beginning of the time engagement is also somewhat responsive to the pressure in chamber 62. As a general rule, the pressure in chamber 62 will be a function of torque demand, such that as torque demand increases, minimum fill pressure values in the friction device 20 will increase.

Figure 2:
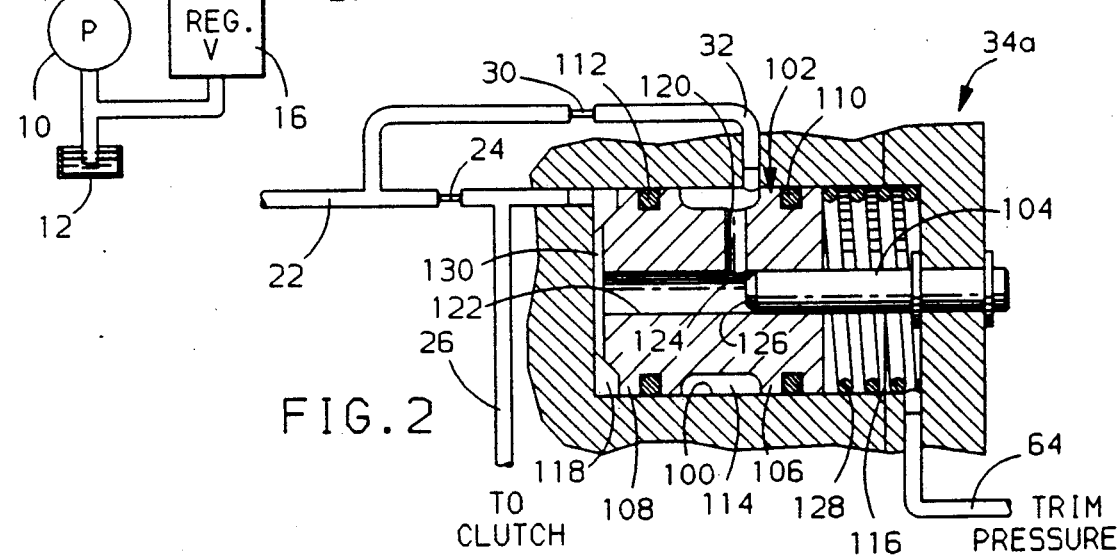
FIG. 2 is a diagrammatic representation of an alternate embodiment of the invention.

FIG. 2 depicts an alternative embodiment of the present invention, wherein the accumulator valve assembly 34a has a substantially different structure. The accumulator and valve assembly 34a includes a valve bore 100 in which is disposed an accumulator piston 102 which is slidably supported on a guide post 104. The accumulator piston 102 has a pair of annular seal surfaces 106, 108, each having a seal groove in which are disposed seals 110 and 112, respectively. These seals prevent fluid leakage from an annular cavity 114 to either a trim chamber 116 or an accumulator chamber 118. The annular cavity 114 also permits fluid communication from the controlled passage 32 to a controlled passage 120, which extends radially through the piston 102 from a central controlled passage 122 to the annular cavity 114. The intersection of the controlled passage 120 and controlled passage 122 provide a control surface 124 which cooperates with the controlled edge surface 126 formed on the guide post 104. A spring 128 urges the piston 102 to the position shown.

During clutch engagement, fluid pressure in the passage 32 passes through the annular cavity 114 and controlled passage 122 to the accumulator chamber 118, which is bounded by a pressure responsive area 130 formed on the piston 102. From the accumulator chamber 118, the fluid pressure passes to passage 26 which is connected with the friction device 20.

At a predetermined pressure level established by the spring 128 and pressure in the trim chamber 116, the piston 102 will respond to fluid pressure at the pressure responsive area 130 and begin or commence to stroke rightward. After a short stroking distance, the controlled edge surface 126 will have traversed the controlled surface 124, such that further fluid flow from passage 22 will have to flow through the restriction 24, prior to reaching the accumulator chamber 118 and the friction device 20. Thus, a controlled engagement pressure for a sufficient time will begin at this point.

Figure 3:
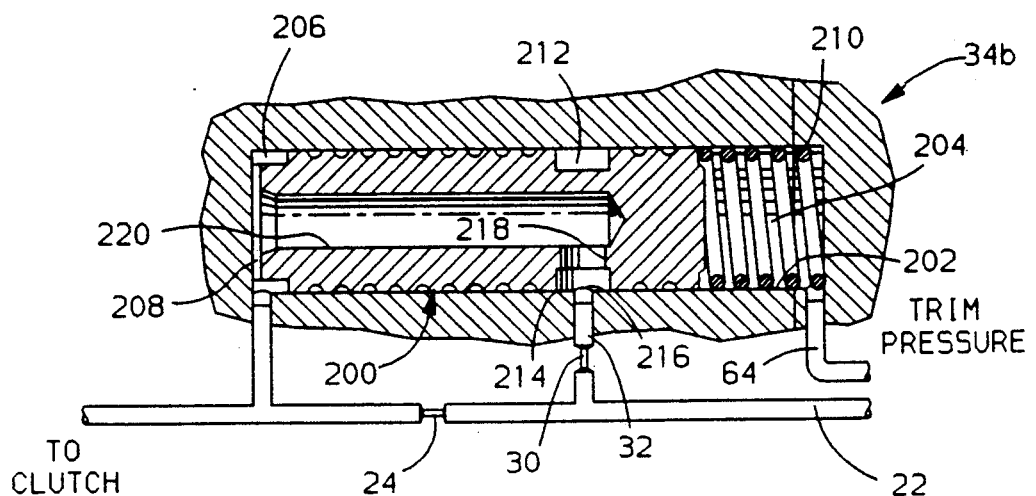
FIG. 3 is a diagrammatic representation of yet another embodiment of the invention.

The structure shown in FIG. 3 includes an accumulator and valve assembly 34b, in which an accumulator piston 200 is slidably disposed in a bore 202 and cooperates with the bore 202 to form a trim chamber 204 and an accumulator chamber 206. The accumulator chamber 206 is bounded to a pressure responsive area 208 formed on one end of the piston 200. The piston 200 is urged leftward in the bore 202 by a spring member 210.

The piston 200 has an annular groove or recess 212 which has an annular control edge 214 adapted to cooperate with a control surface 216 formed between the intersection of passage 32 and the surface of bore 202. The piston 200 has a radial controlled passage 218 and an axial controlled passage 220, which provide fluid communication between the annular recess 212 and the accumulator chamber 206.

As with the embodiments described above for FIGS. 2 and 2, the accumulator and valve assembly 34b passes the initial fluid directed to engage the friction device 20 through the controlled passages 32, 218 and 220, until the fluid pressure in the pressure responsive area 208 is sufficient to cause commencement of the stroke of the accumulator piston 200. After a predetermined amount of stroke, the controlled edge 214 will close the control chamber 216, such that further rise in engagement pressure in the friction device 20 will be controlled by fluid flow through the restriction 24.

Prior art systems utilizing an accumulator and a single orifice control have generally required accumulator volumes in excess of 50,000 cubic millimeters. The present invention permits the use of an accumulator having a volume as low as 7,000 cubic millimeters. This represents a reduction of approximately 86%. Thus, the accumulator can be relocated to many spaces within the transmission which were previously unusable because the spaces were not sufficiently large enough to house the accumulator piston. This will also permit a reduction in the overall size of the transmission and control, particularly in transmissions which utilize two or more accumulators.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A fluid flow control apparatus comprising: an inlet passage means for receiving fluid flow from a fluid source; an outlet passage means for delivering fluid to a device to be controlled; flow restriction means disposed between said inlet and outlet passage means for providing a controlled flow therebetween; and accumulator and valve means in fluid communication with said outlet passage means downstream of said flow restriction means and with said inlet passage means upstream of said flow restriction means including valve controlled passage means connected with said inlet passage means for directing fluid flow from said inlet passage means to said outlet passage means, control valve means movable between open and closed positions for connecting said valve controlled passage means with said outlet passage means in the open position and for disconnecting the valve controlled passage means from said outlet passage means in said closed position, pressure responsive area means responsive to fluid pressure in said outlet passage means to move said control valve means from the open position to the closed position when the pressure is above a predetermined value and accumulator means comprised of a portion of said control valve means, the pressure responsive area means and an expansible chamber cooperating with said restriction means for controlling the pressure increase time in said outlet passage means when the pressure is above said predetermined value.

2. A fluid flow control apparatus comprising: an inlet passage means for receiving fluid flow from a fluid source; an outlet passage means for delivering fluid to a device to be controlled; flow restriction means disposed between said inlet and outlet passage means for providing a controlled flow therebetween; and accumulator and valve means in fluid communication with said outlet passage means downstream of said flow restriction means and with said inlet passage means upstream of said flow restriction means including valve controlled passage means connected with said inlet passage means for directing fluid flow from said inlet passage means to said outlet passage means, control valve means movable between open and closed positions and including control surface means for connecting said valve controlled passage means with said outlet passage means in the open position and for disconnecting the valve controlled passage means from said outlet passage means in said closed position, pressure responsive area means responsive to fluid pressure in said outlet passage means to move said control valve means from the open position to the closed position when the pressure is above a predetermined value and accumulator means comprised of a piston including the pressure responsive area means, an expansible chamber defining an envelope enclosing the piston, a portion of said control valve means, and a portion of said controlled passage means being disposed within the envelope, said expansible chamber and said piston cooperating with said restriction means for controlling the pressure increase time in said outlet passage means when the pressure is above said predetermined value and said control surface has closed said controlled passage.

3. The invention defined in claim 2 wherein at least a portion of said control surface means is formed on said piston.

4. The invention defined in claim 2 wherein a guide post is disposed in the envelope and has at least a portion of the control surface means formed thereon and the piston is slidably disposed on the guide post and further wherein a portion of the controlled passage is a radial passage formed in said piston.

* * * * *